United States Patent [19]
Thorel

[11] 3,868,781
[45] Mar. 4, 1975

[54] POLYGNOMONIC MAP OF THE WORLD COMPRISING TWO HEMISPHERES

[76] Inventor: Jean Thorel, 23, Rue des Volontaires, Paris, France

[22] Filed: Apr. 11, 1974

[21] Appl. No.: 460,011

[30]  Foreign Application Priority Data
Apr. 27, 1973   France .......................... 73.15594

[52] U.S. Cl. .................................. 35/42, 35/46 A
[51] Int. Cl. .......................................... G09b 29/02
[58] Field of Search ............ 35/42, 40, 46 R, 46 A, 35/47; 283/34

[56]   References Cited
   UNITED STATES PATENTS

| 2,393,676 | 1/1946 | Fuller | 35/46 A |
| 2,424,601 | 7/1947 | Crouch | 35/46 A |
| 2,436,860 | 3/1948 | Fisher | 35/46 A |

FOREIGN PATENTS OR APPLICATIONS
| 1,103,710 | 6/1955 | France | 35/46 A |

*Primary Examiner*—Wm. H. Grieb
*Attorney, Agent, or Firm*—Fleit & Jacobson

[57]   ABSTRACT

This polygnomonic map of the world or other spherical body or surface, obtained from an initial set of six maps corresponding to the six vertices $N_0$, $N_1$, $N_2$, $N_3$, $N_4$ and $N_5$ of a first projection icosahedron (1) and to the six diametrally opposite vertices $S_0$, $S_1$, $S_2$, $S_3$, $S_4$ and $S_5$, the two hemispheres of the first map $M_0$ having their centres at the vertices $N_0$ $S_0$ corresponding to the North and South poles, the hemispheres of the next maps being centered to the auxiliary poles consisting of the other vertices of said icosahedron. Each hemisphere consists of a central pentagon $N_1N_2N_3N_4N_5$ obtained by projecting orthogonally all the points of the five triangular sides converging to the pole $N_0$ concerned, of five trapezoidal surfaces joined to the pentagon sides and obtained by taking same from the triangles of a central pentagon belonging to the opposite hemisphere of another map, and of five triangular surfaces $N_1$ $E_1E_{10}$ taken from such triangles of the other hemisphere and transformed topologically.

2 Claims, 10 Drawing Figures

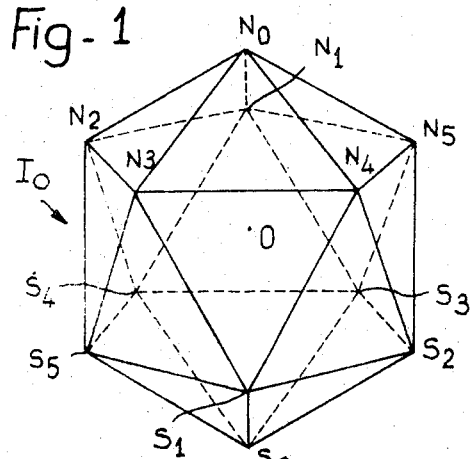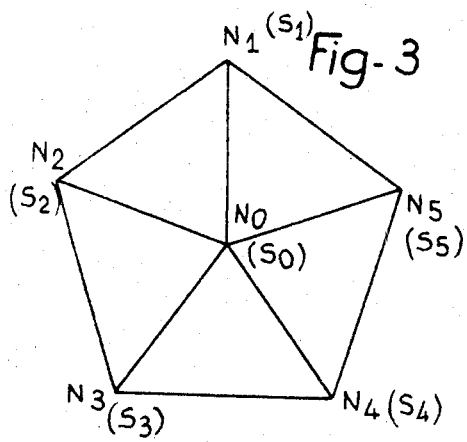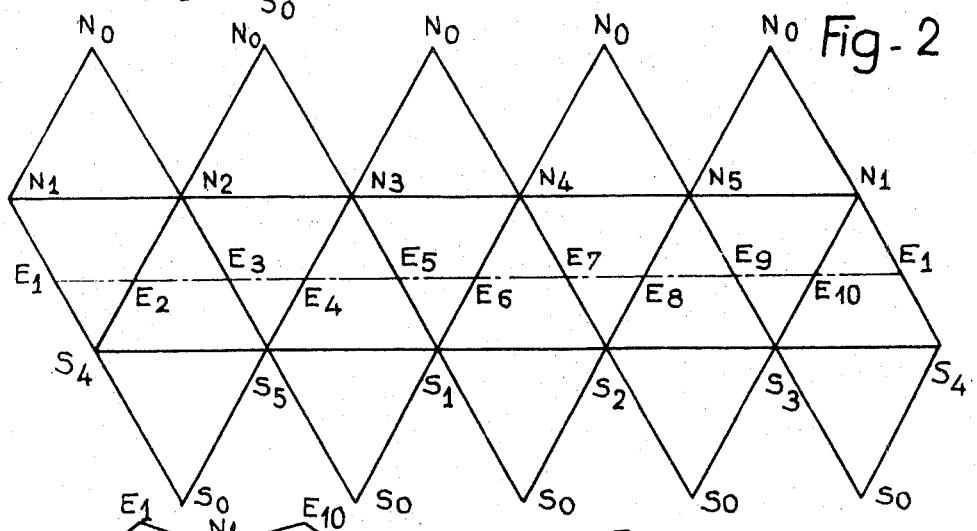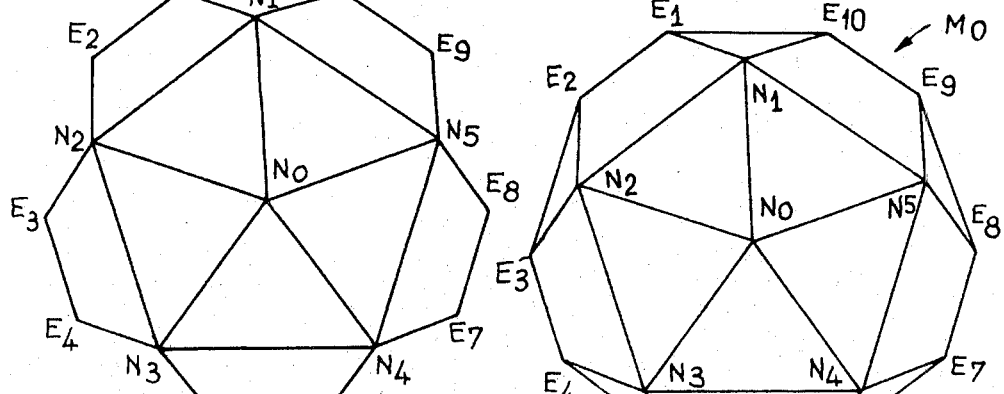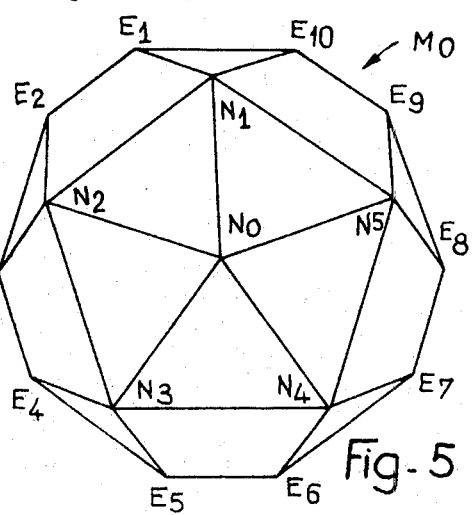

POLYGNOMONIC MAP OF THE WORLD COMPRISING TWO HEMISPHERES

The present invention relates to a polygnomonic map of the world, which comprises two hemispheres and consists of a planisphere or flat mat representing, from a polygnomonic projection on an icosahedron, and in side-by-side relationship, two hemispheres of a globe, for example the terrestrial or earth globe, the moon globe, or of any other planet or celestial body, or of the celestial sphere proper.

A prior French patent No. 1,103,710 describes the polygnomonic projection, which is the gnomonic projection of the globe or sphere concerned on the twenty sides of a regular icosahedron having the same centre as the sphere. Advantageously, the two vertices of the icosahedron which are opposed in relation to the centre are coincident with the North and South poles of the globe.

Various maps conceived from this basic projection are also known. All of them are characterised by the following inconveniences:

certain maps suffer from gaps and therefore, considering the wide range of possible combinations, they require a considerable degree of attention and initiative from the users;

other maps illustrate each only one-third of the globe, so that two or more such maps must be used for any study of the world or other spherical surface represented thereby.

On the other hand, the chief advantage of these maps based on the above-defined projection method is that any large circle is represented in the form of a straight line segment on each side of the first-projection regular icosahedron and on each triangle of the flap maps derived therefrom; now, as far as the terrestrial sphere is concerned, the representation of these large circles has assumed a first-order importance since on the one hand de Montessus de Ballore proved in the first years of this century that earthquakes occurred along a great circle, and on the other hand Spurr proved that silver and copper mines were located along what he describes as his "Silver Belt."

Finally, a report recently sent by the Applicant to the French Academy of Sciences lays stress on the particular importance for the terrestrial globe of the three specific triorthogonal great circles along which most of the volcanos, seisms, earthquakes, mines, larger quarries, oil fields and natural gas reserves are located.

This advantage applies:

to the thirty edges of the regular icosahedron representing the thirty spherical segments limiting on the sphere contemplated twenty equal equilateral spherical triangles;

to the lay-out of the actual equator and of all the meridians passing through the North and South poles;

to the lay-out of auxiliary equators corresponding to opposite auxiliary poles of the Northern hemisphere and Southern hemisphere which are coincident with the other vertices of the icosahedron, and also to the lay-out of the auxiliary meridians passing through these auxiliary poles.

It is the essential object of the present invention to provide a map of the world adapted to eliminate the above described inconveniences characterising hitherto known maps of this type, while preserving their advantages and improving their precision.

This polygnomonic map of the world or other sphere or globe, developed from a first-projection regular icosahedron of which the twenty triangular sides carry the polygnomonic projection of lay-outs formed on a globe or sphere having the same centre as said icosahedron, said common centre being the projection centre for which advantageously but not necessarily two opposite vertices of the icosahedron are selected as constituting the North pole and South pole projections, is characterised in that it is an integral part of a series of six double-hemispherical maps wherein the centre of each hemisphere thus represented is the orthogonal projection of one of said six vertices of the icosahedron and of the vertex diametrally opposite to said one vertex, said centre being coincident with the representation of specific points of the sphere or globe concerned which lie along the projection line, the representation of each hemisphere of a map of such globe or sphere consisting:

a. of a first portion obtained by means of an orthogonal projection of all the points of the five triangular sides of the icosahedron which converge towards the pole of the hemisphere concerned on the plane of a pentagon formed by the five base edges of said five sides, said plane being parallel to the equatorial plane, the pentagon thus inscribing five triangles;

b. of a second portion comprising five trapezoidal surfaces each adjacent to one side of said pentagon, said surfaces being obtained successively by taking from triangles having the same base the central portion of a hemisphere of one of the other globe maps of which the auxiliary pole is the vertex of the triangle formed with said pentagon side, the base of said triangle being the same as said side;

c. of a third portion comprising five triangular surfaces inserted in succession between two adjacent trapeziums joined to the pentagon sides, said triangular surfaces consisting of residual triangular portions taken from the triangles constituting the central zones of the other five maps of spheres after taking therefrom the trapezoidal portions necessary for constituting the representation of the second hemisphere, said triangular portions being transformed topologically and filling completely, after this topological transformation, the free spaces between the trapeziums.

The advantageous feature characterising the globe map according to this invention applies to any local pole or, in other words, to any point of the sphere contemplated which is considered, in the technique of map-making, for example, as the conventional or selected take-off or starting point or landing point of aircrafts, ships or any other vehicles or missiles. Under these conditions, the meridians of this local pole constitute the orthodromic routes extending from or leading to said pole — the shortest routes on the sphere contemplated — and it is possible to trace either a single meridian, constituting the orthodromic route, or a complete network of equally spaced meridians, for example if said local pole is an airport or seaport.

It is also possible to trace a local equator giving all the points located at a distance of 10,000 kilometers on the terrestrial sphere.

The points where the broken line (orthodromic route) intersects the edges of the icosahedron are obtained very rapidly from aligned-point nomograms.

It may also be emphasized that it is notoriously advantageous to represent any large circle by means of a straight line when preparing any polygnomonic map. Thus, for instance, on the terrestrial globe, any point is determined by its longitude and its latitude, and positioning this point on a polygnomonic map implies the intersection of a meridian with a parallel, i.e. a straight line with an ellipse.

However, a great circle, obtained by simply reading a predetermined table, may be substituted for the ellipse in the polygnomonic projection.

In this case the location of a point on the polygnomonic map is obtained by simply tracing two straight lines, thus enhancing the rapidity and precision of the work.

The following advantages are derived from the maps of the world prepared according to the present invention:

1. The user's mind and spirit are not warped, in contrast to the use of conventional atlases in which small and large countries frequently take the same place;

2. In contrast to the representation of the Mercator map:
   a. the total area of the sphere contemplated is represented completely;
   b. more particularly, the poles, which are of primary importance for meteorology and aviation, are properly represented;
   c. no pronounced distortion of the high-altitude lands is observed;
   d. the orthdromic routes represented by straight lines on each side of the icosahedron can be traced very rapidly and extend completely within each map of the world or the like; on the other hand, in the Mercator projection map these routes are shown in the form of sinusoids that must be traced point by point, and these routes frequently fall out of the map and are reintroduced into it at a relatively remote point, thus making it very difficult to follow them;
   e. erroneous decisions having had tragical consequences have notoriously resulted from the use of Mercator maps;

3. In contrast to terrestrial or celestial globes, the maps according to the present invention give an instantaneous and integral view of the sphere represented thereby;

4. The maps according to this invention permit of studying the evolution of certain conditions with time, hence its important application in meteorology;

5. The transmission of these maps by television means is particularly simple;

6. A plurality of maps drawn or printed on transparent support media can be superposed;

7. Any desired point of a sphere surface can be represented with a high degree of precision by the intersection of two straight lines;

8. The weight and over-all dimensions of the maps according to this invention are extremely reduced in comparison with conventional globes, thus reducing transport expenses and permitting of dispensing with special packings;

9. The maps according to this invention are considerably cheaper to manufacture than conventional globes, especially in the case of large-scale maps;

10. The maps can be edited in different languages, and made with a "world centre," i.e. centered on any desired point of the globe;

11. As a consequence of (10), the extension to third-world Countries and teaching are greatly simplified;

12. By using six different maps according to this invention and indicating the orthodromic routes it is possible to market such maps throughout the world.

In order to afford a clearer understanding of this invention and of the manner in which the same can be carried out in actual practice, a typical form of embodiment of a polygnomonic map of the World according to this invention will now be described by way of example with reference to the accompanying drawings in which:

FIG. 1 illustrates in perspective an icosahedron wherein the upper vertex corresponds to the North pole and the lower vertex to the South pole of the globe to be converted into maps;

FIG. 2 is a flat developed view of the icosahedron, according to the conventional method;

FIG. 3 is a pentagon of the orthogonal projection of the upper sides of the icosahedron which converge to the vertex corresponding to the North pole and are an integral part of the Northern hemisphere of the first map of the world (central area of the Northern hemisphere representation);

FIG. 4 illustrates the pentagon of FIG. 3 having disposed therearound the trapeziums of the fractions taken from the central areas of the five other maps and limited by the equator;

FIG. 5 illustrates the complete Northern hemisphere of the first map; and

Figure 6:
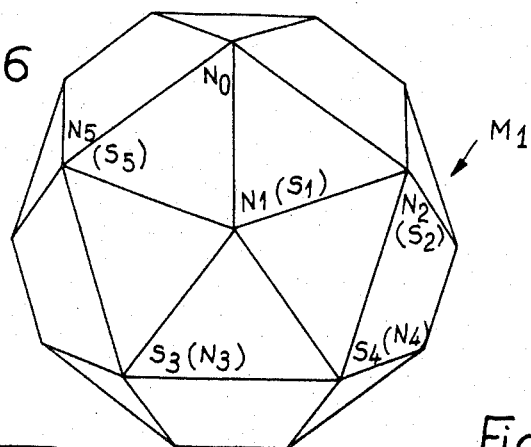
Figure 7:
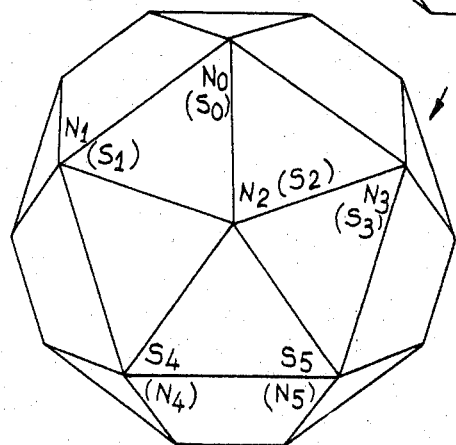
Figure 8:
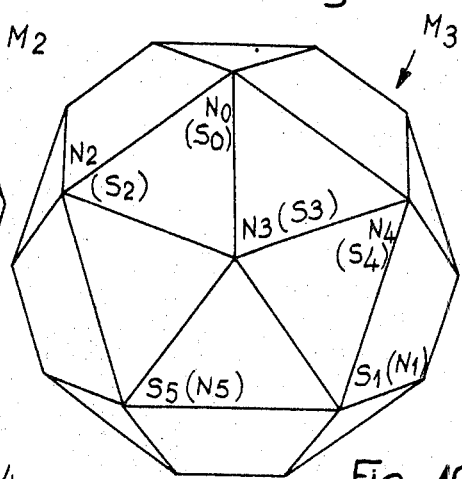
Figure 9:
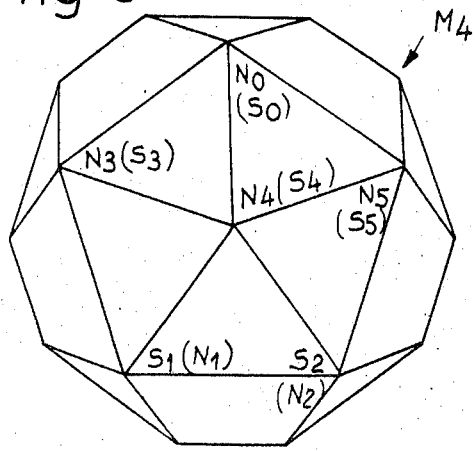
Figure 10:
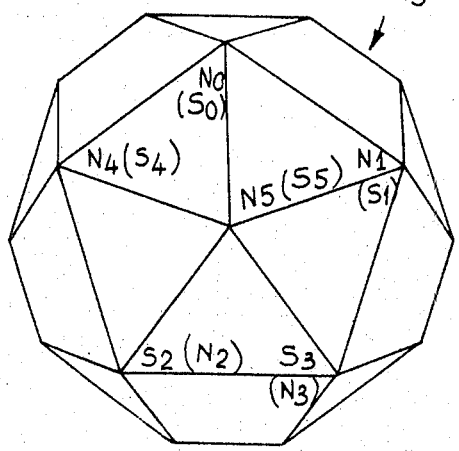

FIGS. 6 to 10 inclusive illustrate the upper hemisphere of each one of the five maps of the world prepared with auxiliary poles consisting of vertices of the icosahedron other than the North and South poles vertices.

Referring first to FIG. 1 of the drawings, the "sphere illustrated comprises a regular icosahedron $I_o$ of which the centre 0 is coincident with the centre of the globe to be projected (not shown), this icosahedron comprising at its upper portion a vertex $N_0$ corresponding to the North pole of the globe to be projected, and at its lower portion another vertex $S_0$ corresponding to the South pole of the globe concerned. Five triangular sides or faces $N_0N_1N_2$, $N_0N_2N_3$, $N_0N_3N_4$, $N_0N_4N_5$, and $N_0N_5N_1$ converge to the vertex $N_0$; similarly, five triangular sides or faces $S_0S_1S_2$, $S_0S_2S_3$, $S_0S_3S_4$, $S_0S_4S_5$ and $S_0S_5S_1$ converge to the vertex $S_0$; the central area of the icosahedron consists of the ten triangular sides or faces $N_1N_2S_4$, $N_2N_3S_5$, $N_3N_4S_1$, $N_4N_5S_2$, $N_5N_1S_3$, $S_1S_2N_4$, $S_2S_3N_5$, $S_3S_4N_1$, $S_4S_5N_2$ and $S_5S_1N_3$.

By developing the icosahedron I, developed on a flat plane, a central strip containing the above-mentioned ten triangles is obtained (FIG. 2), this strip being limited by a pair of parallel lines $N_1N_2N_3N_4N_5N_1$ and $S_4S_5S_1S_2S_3S_4$ corresponding to the edges of the bases of the triangles converging to vertex $N_0$ and to vertex $S_0$, respectively. Above this central strip the five triangles converging to $N_0$ are found again; below this strip the triangles converging to $S_0$ are also found. An equator line parallel to the two lines limiting this central strip intersects at points $E_1$, $E_2$, ... $E_{10}$ the middle of the sides of the triangles forming said two lines with their bases.

To prepare the maps of the globe, six polygnomonic maps $M_0$, $M_1$, $M_2$, $M_3$, $M_4$, $M_5$, each consisting of an upper hemisphere and a lower hemisphere (designated in each case by completing the refrence symbols of these maps with the index $n$ or $s$, respectively) are drafted.

The first map consists of the icosahedron $I_o$ of FIG. 1, of which the vertices $N_0$, $S_0$ correspond to the North and South poles, respectively. The other five maps are obtained with Northern-hemisphere auxiliary poles corresponding to the vertices $N_1$, $N_2$, $N_3$, $N_4$ and $N_5$ of icosahedron $I_0$, and Southern-hemisphere auxiliary poles corresponding to the vertices $S_1$, $S_2$, $S_3$, $S_4$, $S_5$ of icosahedron $I_0$, respectively.

Thus, considering the hemisphere of map $M_0$, the central points are $N_0$ and $S_0$, respectively; in map $M_1$, the central points are $N_1$ and $S_1$; in map $M_2$ the central points are $N_2$ and $S_2$; in map $M_3$, the central points are $N_3$ and $S_3$; in map $M_4$, the central points are $N_4$ and $S_4$, and in map $M_5$ the central points are $N_5$ and $S_5$ (see FIGS. 5 to 10 inclusive), respectively.

Now the construction of the map $M_0$ of the terrestrial globe will be described in detail, it being understood that the other five maps are constructed in a similar manner.

To obtain the northern hemisphere of $M_0$ the five points $N_1$, $N_2$, $N_3$, $N_4$ and $N_5$ of the upper portion following the ends of the edges of the icosahedron which converge to point $N_0$ are considered on the icosahedron I of FIG. 1 developed in FIG. 2 (on whose sides the tracings of the terrestrial globe surface are transferred by projection). These five points lie in a plane parallel to the equator and the contour $N_1 N_2 N_3 N_4 N_5$ formed by the icosahedron edges constitutes a regular pentagon.

The edges $N_0N_1$, $N_0N_2$, $N_0N_3$, $N_0N_4$ and $N_0N_5$ are projected orthogonally on this pentagon, the point $N_0$ being coincident with the central point of the pentagon. Then all the points of the tracings of the five sides or faces of the icosahedron which lead to the plane of said pentagon at $N_0$ are projected orthogonally. Thus, the representation of one-fourth of the terrestrial globe surface is obtained on a central portion of a first hemisphere of the map $M_0$ contemplated. The same procedure is adhered to for the second hemisphere to obtain in the central portion a pentagon $S_1S_2S_3S_4S_5$ with a central point $S_0$, which corresponds to a second fourth of the terrestrial surface area. Thus, one-half of this surface area is obtained.

Then, exactly the same method is used for obtaining the representation of the two hemispheres of the five maps $M_1$, $M_2$, $M_3$, $M_4$ and $M_5$ of which one hemisphere is illustrated successively in FIGS. 6 to 10 of the drawings, with vertex indices N, the indices between brackets corresponding to the opposite hemisphere.

Reverting to the icosahedron I of FIG. 1, which is utilized for projecting the map $M_0$, it will be seen that:

edge $N_1N_2$ is common to both sides $N_0N_1N_2$ and $N_1N_2S_4$

" $N_2N_3$ " " " $N_0N_2N_3$ and $N_2N_3S_5$
" $N_3N_4$ " " " $N_0N_3N_4$ and $N_3N_4S_1$
" $N_4N_5$ " " " $N_0N_4N_5$ and $N_4N_5S_2$
" $N_5N_1$ " " " $N_0N_5N_1$ and $N_5N_1S_3$ Then, triangular sides from each one of the following maps $M_4$, $M_5$, $M_1$, $M_2$, $M_3$ are taken as follows:

from $M_4$, hemisphere having a pole $S_4$, the triangular side $N_1N_2S_4$

" $M_5$, " " " $S_5$, " " " $N_2N_3S_5$
" $M_1$, " " " $S_1$, " " " $N_3N_4S_1$
" $M_2$, " " " $S_2$, " " " $N_4N_5S_2$
" $M_3$, " " " $S_3$, " " " $N_5N_1S_3$.

These triangular sides are cut successively at equator level as shown in FIG. 2, along the lines $E_1E_2$, $E_3E_4$, $E_5E_6$, $E_7E_8$ and $E_9E_{10}$ to yield five trapezoidal surfaces $N_1N_2E_1E_2$, $N_2N_3E_3E_4$, $N_3N_4E_5E_6$, $N_4N_5E_7E_8$ and $N_5N_1E_9E_{10}$, respectively.

Each one of these surfaces has its major base coincident with one of the five sides of pentagon $N_1N_2$, $N_2N_3$, $N_3N_4$, $N_4N_5$ and $N_5N_1$ (in the order given hereinabove) which represent the Northern hemisphere of map $M_0$; thus, FIG. 4 is obtained.

The equatorial lines, the trapezoidal surfaces and the centres of the areas from which they are taken are clearly shown in FIG. 2. The same operation is repeated for obtaining the southern hemisphere of map $M_0$, by simply changing the above letter N to S and changing the indices of letters E in a manner obvious to those conversant with the art.

At the end of this operation, the seven eighths of the total globe surface area are obtained on map $M_0$, at the same scale throughout.

To complete the image of FIG. 4, a topological transformation is applied to the triangular portions $N_2E_2E_3$, $N_3E_4E_5$, $N_4E_6E_7$, $N_5E_8E_9$ and $N_1E_{10}E_1$ remaining after cutting the trapezoidal surfaces on the triangular surfaces taken in the central areas of the first hemispheres of maps $M_2$, $M_3$, $M_4$, $M_5$ and $M_1$ respectively, this topological transformation being accomplished as follows:

1. the triangles are enlarged photographically in such a manner that their bases $E_n E_{n+1}$ be equal to:

$E_2E_3 = E_4E_5 = E_6E_7 = E_8E_9 = E_{10}E_1$, their lengths being measured on the representation of the Northern hemisphere of FIG. 4, the indices corresponding to those shown in this figure.

2. After enlarging the bases these triangles are brought in succession to their final position in FIG. 4, in coincidence with $E_2E_3$, $E_4E_5$, $E_6E_7$, $E_8E_9$ and $E_{10}E_1$.

The five triangles are pivoted about their bases through an angle such that the orthogonal projection of their vertices on the plane of map $M_0$ of FIG. 4 be coincident with the successive points $N_2$, $N_3$, $N_4$, $N_5$ and $N_1$, respectively. The tracings are projected on the triangles on the plane of FIG. 4, and thus the image of FIG. 5 is obtained.

The same procedure is adhered to for the South hemisphere with the triangles remaining after cutting the corresponding trapezoidal areas of the second hemisphere of the other maps.

At the end of this operation, 100 percent of the globe surface are obtained, but the last ⅛ is topologically distorted.

However, this topological transformation thus accomplished did not destroy the fundamental property of polygnomonic maps: the representation of the axes of the great circles for this last ⅛ of the terrestrial surface is a straight line, i.e. a line easy to trace, since the two points whereat it intersects two of the three sides of the triangle are known.

The representation of each hemisphere is limited by a semi-regular decagon.

Having thus obtained the two complete hemispheres of map $M_0$, a similar procedure is applied for obtaining the two hemispheres of maps $M_1$, $M_2$, $M_3$, $M_4$ and $M_5$, respectively, by completing the pentagons of the central portion with corresponding trapeziums adjacent the pentagon sides and with topologically distorted triangles completing in turn said trapeziums.

The user of maps obtained according to the present invention may select freely any one of the six maps of the globe, which map in all cases is sufficient for representing by itself the entire earth, or any other planet contemplated, or the celestial vault, or all the orthodromic routes and all the major circles of the sphere.

From a given initial or starting point characterised by a high-density traffic, it is customary to establish three maps of the orthodromic routes of which the centres consist of the three vertices, respectively, of the equilateral triangle in which the point concerned, for example an airport, is located.

Thus, according to their current activities, travellers may advantageously select one of the maps of the world instead of the other two. Thus, they can avoid the topological distortions of the triangular sections.

Although a specific form of embodiment of this invention has been described hereinabove and illustrated in the accompanying drawings, it will readily occur to those skilled in the art that various modifications and changes may be brought thereto without departing from the scope of the invention as set forth in the appended claims.

What is claimed is:

1. An assembly of six maps of the world or other spherical body, obtained from a polygnomonic map of the world or other spherical body, which consists of a regular icosahedron of which the twenty triangular sides carry a tracing of the elements of a globe of same centre as said icosahedron, said centre being that of the polygnomonic projection of said tracing on the icosahedron of which two vertices are advantageously coincident with the poles of the globe concerned and on whose respective sides all the major circles of said globe are represented in the form of segments of straight lines, characterised in that said six maps ($M_0$, $M_1$, $M_2$, $M_3$, $M_4$ and $M_5$) comprise each the representation of two opposite hemispheres, said six maps corresponding to the six vertices, respectively, of the first-projection icosahedron ($N_0$, $N_1$, $N_2$, $N_3$, $N_4$ and $N_5$) and to the six diametrally opposite vertices ($S_0$, $S_1$, $S_2$, $S_3$, $S_4$ and $S_5$), the two hemispheres thus represented on the first map ($M_0$) having as their centres the vertices ($N_0$, $S_0$) corresponding respectively to the North and South poles of the globe concerned, the hemispheres represented on the next maps ($M_1$, $M_2$, $M_3$, $M_4$ and $M_5$) having their centres constituted respectively by the auxiliary poles consisting of the other diametrally opposite vertices ($N_1$, $S_1$; $N_2$, $S_2$; $N_3$, $S_3$; $N_4$, $S_4$ and $N_5$, $S_5$) of said icosahedron (I), the representation of each hemisphere of a map comprising:

a. a first portion obtained by the orthogonal projection of all the points of the five triangular sides ($N_0N_1N_2$, $N_0N_2N_3$, $N_0N_3N_4$, $N_0N_5N_1$) of said icosahedron (I) which converge to the pole ($N_0$) of the hemisphere concerned, on the plane of the pentagon ($N_1N_2N_3N_4N_5$) formed by the five base edges ($N_1N_2$, $N_2N_3$, $N_3N_4$, $N_4N_5$, $N_5N_1$) of said five sides, said plane being parallel to the equator plane, and the projection of said pole ($N_0$) on said plane being coincident with the central point of the pentagon;

b. a second portion comprising five trapezoidal surfaces ($N_1N_2E_2E_1 \ldots N_5N_1E_{10}E_9$) each joined to one side ($N_1N_2 \ldots N_5N_1$) of said pentagon, said surfaces being obtained successively by taking them from triangles having corresponding bases ($N_1N_2, \ldots N_5N_1$) and limited by a real or auxiliary equator line ($E_1E_2, \ldots E_9E_{10}$) of a pentagon representing the central hemisphere portion of one of the other maps which is constituted around an auxiliary pole ($S_4$, $S_5$, $S_1$, $S_2$ and $S_3$) corresponding to the vertex of the triangle ($N_1N_2S_4 \ldots N_5N_1S_3$) of the central portion of said icosahedron (I) of which the base is the specific one of the sides ($N_1N_2, \ldots N_5N_1$) of the pentagon ($N_1N_2N_3 N_4N_5$) to which the thus taken trapezoidal surface is to be joined;

c. and a third portion comprising five triangular surfaces ($N_1E_1E_{10}$, $N_2E_3E_2$, $N_3E_5E_4$, $N_4E_7E_6$, $N_5E_9E_8$) inserted successively between two adjacent trapeziums joined to the sides ($N_1N_2$, $N_2N_3$, $N_3N_4$, $N_4N_5$) of the pentagon ($N_1N_2N_3N_4N_5$), said triangular surfaces being obtained by taking the remaining triangular portions of the triangles constituting the central areas of the other five maps, after removing therefrom the trapezoidal portions necessary for constituting the representation of the second hemisphere, said triangular portions being converted topologically and filling thereafter any empty space between the trapeziums.

2. Polygnomonic map of the world or other spherical body or surface, according to claim 1, characterised in that the topological triangular surfaces are obtained firstly by enlarging by a photographic process the triangular portions ($N_1E_1E_{10}$, $N_2E_3E_2$, $N_3E_5E_4$, $N_4E_7E_6$ and $N_5E_9E_8$) remaining after the removal of said trapezoidal surface portions, whereby the bases of said triangles have the magnitude ($E_{2n} E_{2n+1}$) measured on the plane of the pentagon between the adjacent joined trapeziums and, after said enlargement, having their bases brought to the final location and their vertices disposed orthogonally to the vertex concerned, all the representative points being projected orthogonally on said triangles in the plane of said map.

* * * * *